March 24, 1959 A. C. CAPELLE Re. 24,623
TELEVISION ALIGNMENT TOOL
Original Filed Jan. 13, 1955 2 Sheets-Sheet 1
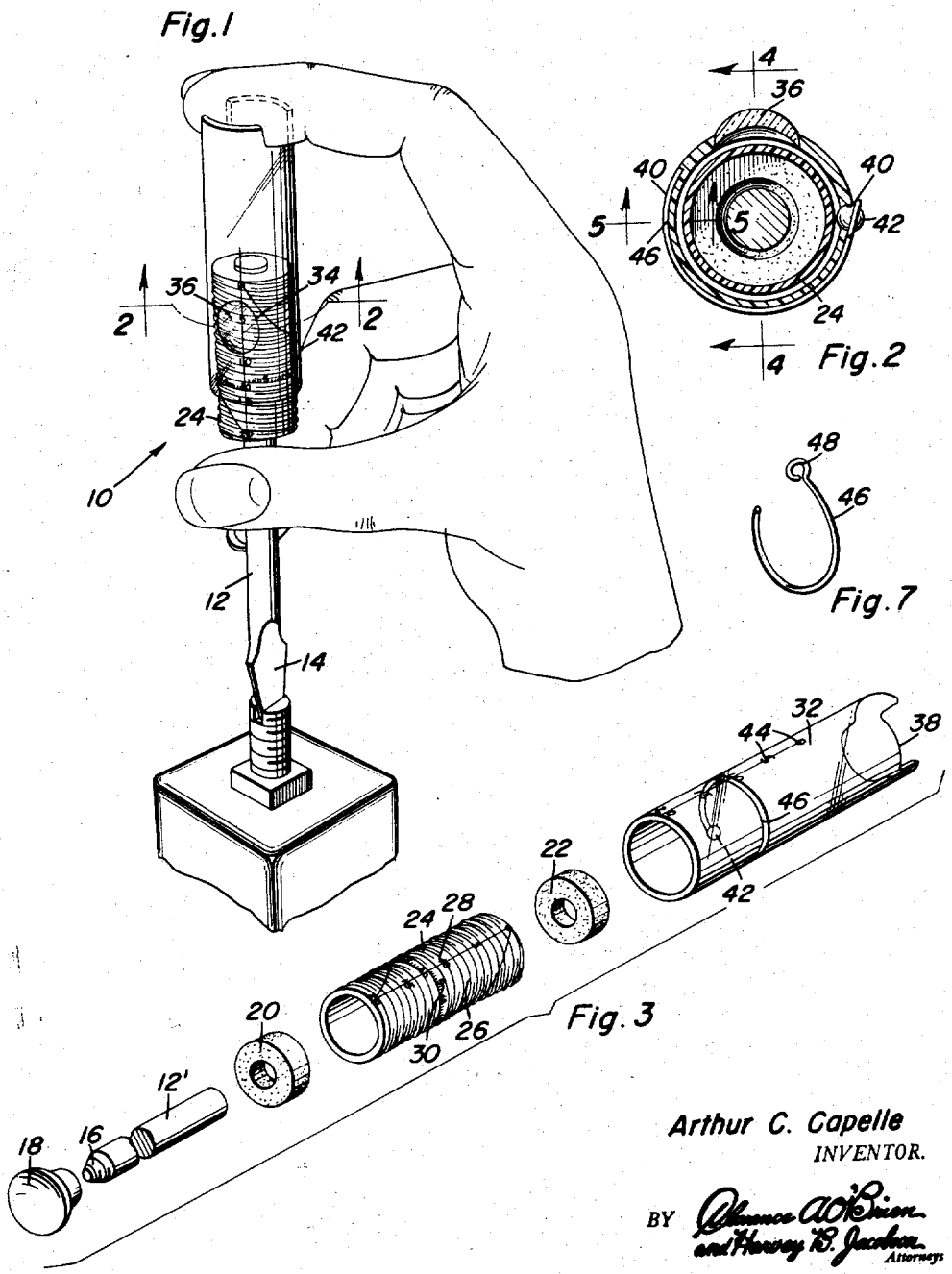
Arthur C. Capelle
INVENTOR.
BY Clarence A. O'Brien and Harvey B. Jacobson
Attorneys

TELEVISION ALIGNMENT TOOL

Original Filed Jan. 13, 1955 2 Sheets-Sheet 2

Arthur C. Capelle
INVENTOR.

BY Clarence A. O'Brien and Harvey B. Jacobson
Attorneys

United States Patent Office

Re. 24,623
Reissued Mar. 24, 1959

24,623

TELEVISION ALIGNMENT TOOL

Arthur C. Capelle, Bradenton, Fla.

Original No. 2,817,985, dated December 31, 1957, Serial No. 481,539, January 13, 1955. Application for reissue October 8, 1958, Serial No. 766,151

9 Claims. (Cl. 81—3)

Matter enclosed in heavy brackets [ ] appears in the original patent but forms no part of this reissue specification; matter printed in italics indicates the additions made by reissue.

This invention relates generally to the class of tools and more particularly to a device especially adapted for utilization in the adjustment of control screws for television sets and the like.

The primary object of the present invention resides in the provision of an alignment tool having means for determining the change of position of an adjustment screw or the like independent of the number of separate turns in one direction or the other during the alignment procedures.

The construction of this invention features the utilization of a novel indexing member which is held by means of a resilient clip on a transparent index housing received over a cylindrical member having a grooved scale thereon which carries the shank of the blade.

Still further objects and features of this invention reside in the provision of an alignment tool that is simple in construction, highly efficient in operation, and relatively inexpensive to manufacture, thereby permitting wide distribution and utilization.

These, together with the various ancillary objects and features of the invention which will become apparent as the following description proceeds, are attained by this alignment tool, preferred embodiments of which have been illustrated in the accompanying drawings, by way of example only, wherein:

Figure 1 is a perspective view illustrating the manner in which the alignment tool comprising the present invention can be utilized;

Figure 2 is an enlarged horizontal sectional view as taken along the plane of line 2—2 in Figure 1;

Figure 3 is an exploded perspective view of a modified form of the alignment tool employing a shank with a suction cup or blade holder appended thereto;

Figure 7 is a perspective view of the clip utilized to hold the indexing member in position;

Figure 4:
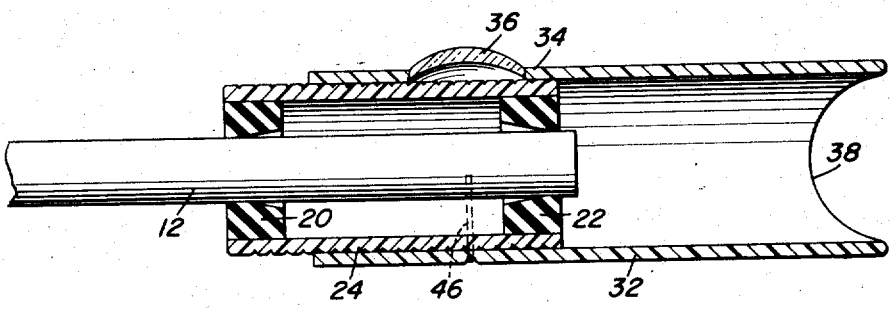
Figure 4 is an enlarged vertical sectional view as taken along the plane of line 4—4 in Figure 2.

With continuing reference to the accompanying drawings wherein like reference numerals designate similar parts throughout the various views, reference numeral 10 generally designates the alignment tool comprising the present invention. This alignment tool includes a shank 12 which may be of any particular form, as desired, and which, as is seen in Figure 1, may have a screwdriver blade 14 at the end thereof, or, as is shown in Figure 3, a shank 12' may be provided with a threaded end 16 for threaded engagement with a suction cup 18 or other suitable blade holder. The shanks 12 or 12' are receivable as can be best seen in Figures 3 and 4, in resilient washers 20 and 22 which themselves are received within a cylindrical member 24 to frictionally and resiliently hold the shank 12 for rotation with the cylindrical member 24. The cylindrical member 24 is provided with a spiral *or helical* groove 26 cut into the surface thereof as well as suitable indicia 28 and other indicia 30, the indicia 28 and 30 being disposed on the surface of the cylindrical member 24 and being arranged with respect to the groove 26 for indicating the position of the cylindrical member 24 with respect to a transparent index housing 32. The groove 26 and indicia 28 and 30 form a suitable scale The transparent index housing or *sleeve* 32 is concentrically disposed about the cylindrical member 24 and has an opening 34 therein for reception of a magnifying glass 36 which enables the indicia 28 and 30 to be readily observed to thus determine the position of the cylindrical member 24. The housing 32 may be provided with a finger receiving recess 38 in the upper end thereof so that the housing 32 may be held stationary while the blade 12 is rotated, using the thumb and third finger of the hand, as is best seen in Figure 1. Obviously, the tool may be manipulated in any way, as found comfortable by the user.

The housing 32 is provided with an aperture 40 therein of suitable configuration so as to form a seat for a spherical indexing member 42 while preventing passage of the indexing member 42 all the way through the aperture 40. However, the portion of the indexing member 42 that extends through the aperture 40 will engage within the spiral groove 26 in the cylindrical member 24 and thus, due to the rotation of the cylindrical member 24 when the shank 12 is rotated, and because of the engagement of the indexing member 42 with the groove 26, the housing 32 will advance so as to change its relative longitudinal position with respect to the cylindrical member 24. This may be readily ascertained, utilizing the magnifying glass 36 to read the indicia 28 and 30 on the cylindrical member 24 and by utilization of the indicia 44 on the housing 32 in the obvious manner.

The ball indexing member 42 is held in place by means of a clip 46 having a loop 48 receiving the indexing member 42 but not permitting passage of the indexing member entirely therethrough. The clip 46 is positioned so as to resiliently embrace the housing 32.

Figure 8:
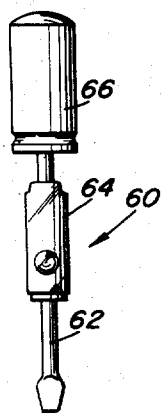
Figure 8 is an elevational view of a modified form of the invention employing a handle for the shank.
Figure 10:
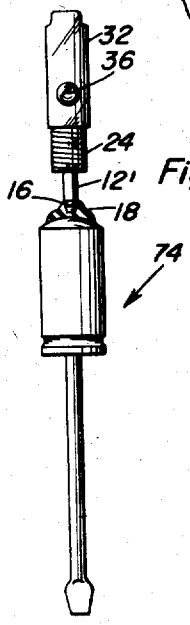
Figure 10 is an elevational view illustrating the manner in which the blade holder is secured to the blade, such as a screwdriver.

If it is desired, the shank of the form of the alignment tool as indicated by reference numeral 60 and as can be best seen in Figure 8 and designated by reference numeral 62 may extend entirely through the cylindrical member of this form of the invention and through the housing 64 and may be provided with a handle 66 so that the handle may be grasped and rotated with the housing 64 held stationary by the other hand. Alternatively, the shank 12 may have its threaded end portion 16 threaded into a threaded recess 68 in the handle 70 of a screwdriver-like tool 72, or, as is shown best in Figure 10, a screwdriver-like tool generally designated by reference numeral 74 may have the tool engaging member or suction cup 18 affixed thereto in a detachable manner.

Figure 6:
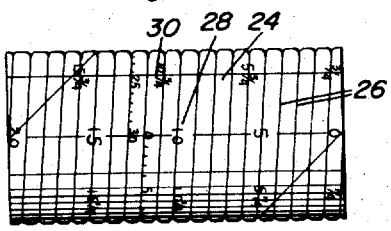
Figure 6 is an enlarged elevational view of the cylindrical member provided with the spiral groove.
Figure 5:
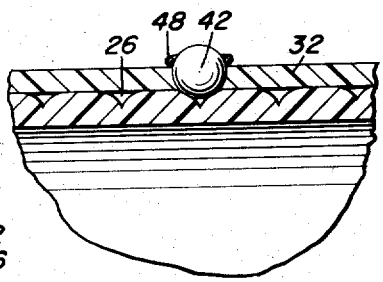
Figure 5 is an enlarged sectional detail view as taken along the plane of line 5—5 in Figure 2 and illustrating the construction of the indexing member engageable within the spiral groove formed in the cylindrical member.
Figure 9:
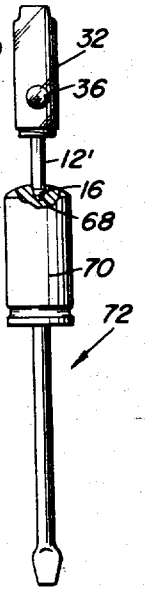
Figure 9 is an elevational view of a modified form of the invention in which the shank is threadedly secured to the blade.

In use, when it is desired to operate the tool, the tool may be grasped in the manner as is shown in Figure 1 with the blade 14 received in the head of the screw adjustment member to be turned. Then if the indicator is in an initial position by using the thumb and third finger, the shank 12 may be rotated. This will cause the member 42 to ride within the groove 26. The number of turns made by the shank 12 will be then readily visibly determined by observation of the indicating mechanism. utilizing the magnifying glass 36 to read the indicia 28 and 30 on the cylindrical member 24 and by utilizing the indicia 44 on the housing 32. It is to be noted (see Figure 6) the number of turns may be ascertained by subtracting the value of the scale reading of an initial position from the value of the scale reading of a final position utilizing the indicia of the scale to determine the number of turns and fractions of a turn made by the tool.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An alignment tool comprising a shank, a cylindrical member carried by said shank for rotation therewith, said cylindrical member having a scale thereon, said scale including a spiral groove, an index housing of cylindrical shape concentrically disposed about said cylindrical member, said index housing having an aperture therein and an indexing member in said aperture engaging said helical groove, and a resilient clip holding said indexing member in engagement with said groove, said clip embracing said housing.

2. An alignment tool comprising a shank, a cylindrical member carried by said shank for rotation therewith, said cylindrical member having a scale thereon, said scale including a spiral groove, an index housing of cylindrical shape concentrically disposed about said cylindrical member, said index housing having an aperture therein and an indexing member in said aperture engaging said helical groove, said aperture forming a seat for said index member, said indexing member being of spherical [congura-tion] *configuration,* and a resilient clip holding said indexing member in engagement with said groove, said clip embracing said housing.

3. An alignment tool comprising a shank, a cylindrical member carried by said shank for rotation therewith, said cylindrical member having a scale thereon, said scale including a spiral groove, an index housing of cylindrical shape concentrically disposed about said cylindrical member, said index housing having an aperture therein and an indexing member in said aperture engaging said helical groove, resilient washers in said cylindrical member, said washers embracing said shank and holding said cylindrical member on said shank.

4. An alignment tool comprising a shank, a cylindrical member carried by said shank for rotation therewith, said cylindrical member having a scale thereon, said scale including a helical groove, an index housing of cylindrical shape concentrically disposed about said cylindrical member, said index housing having an aperture therein and an indexing member in said aperture engaging said helical groove, said housing being transparent, an opening in said housing, and a magnifying glass in said opening.

5. An alignment tool comprising a shank, a cylindrical member carried by said shank for rotation therewith, said cylindrical member having a scale thereon, said scale including a spiral groove, an index housing of cylindrical shape concentrically disposed about said cylindrical member, said index housing having an aperture therein and an indexing member in said aperture engaging said spiral groove, said aperture forming a seat for said indexing member, said indexing member being of spherical configuration, and a resilient clip holding said indexing member in engagement with said groove, said clip embracing said housing, resilient washers in said cylindrical member, said washers embracing said shank and holding said cylindrical member on said shank, said housing being transparent, an opening in said housing, and a magnifying glass in said opening.

6. An alignment tool comprising a shank, a cylindrical member carried by said shank for rotation therewith, said cylindrical member having a scale thereon, said scale including a spiral groove, an index housing of cylindrical shape concentrically disposed about said cylindrical member, said index housing having an aperture therein and an indexing member in said aperture engaging said spiral groove, said aperture forming a seat for said indexing member, said indexing member being of spherical configuration, and a resilient clip holding said indexing member in engagement with said groove, said clip embracing said housing, resilient washers in said cylindrical member, said washers embracing said shank and holding said cylindrical member on said shank, said housing being transparent, an opening in said housing, and a magnifying glass in said opening, and a finger receiving recess in the upper end of said index housing.

7. An alignment tool comprising a shank, a cylindrical member carried by said shank for rotation therewith, said cylindrical member having a scale thereon, said scale including a spiral groove, an index housing of cylindrical shape concentrically disposed about said cylindrical member, said index housing having an aperture therein and an indexing member in said aperture engaging said spiral groove, a suction cup carried by said shank, and a blade carried by said cup.

*8. A tool of the character described for registering the number of turns and fraction of a turn given a rotatable part, such as a screw, said tool comprising a shank whereby the rotatable part is turned, a cylindrical member carried by said shank for rotation therewith and having a helical groove provided therein, a transparent index sleeve member in slidable telescoping relation to said spirally grooved cylindrical member and having an aperture therein and an annular external groove in register with said aperture, and a spring ring entered closely in said groove holding a part projecting through said aperture resiliently in engagement in the helical groove so that the sleeve member if held is given endwise movement relative to the cylindrical member when the latter is turned relative thereto, one of said cylindrical and sleeve members having a scale thereon whereby the number of turns is indicated by the scale's relationship to an index on the other of said members.*

*9. A tool of the character described for registering the number of turns and fraction of a turn given a rotatable part, such as a screw, said tool comprising a shank whereby the rotatable part is turned, a cylindrical member carried by said shank for rotation therewith and having a helical groove provided therein, and a transparent index sleeve member in slidable telescoping relation to said spirally grooved cylindrical member and having a radially inward projection engaging in the helical groove so that the sleeve member if held is given endwise movement relative to the cylindrical member when the latter is turned relative thereto, one of said cylindrical and sleeve members having a scale thereon whereby the number of turns is indicated by the scale's relationship to an index on the other of said members.*

References Cited in the file of this patent or the original patent

UNITED STATES PATENTS

| | | |
|---|---|---|
| 1,575,560 | Englund | Mar. 2, 1926 |
| 1,654,319 | Brown | Dec. 27, 1927 |
| 1,885,579 | Boynton | Nov. 1, 1932 |
| 2,033,892 | Parvin | Mar. 10, 1936 |
| 2,330,535 | Younger | Sept. 28, 1943 |
| 2,339,210 | Volz | Jan. 11, 1944 |
| 2,440,854 | Frank | May 4, 1948 |